(12) United States Patent
Lidbetter et al.

(10) Patent No.: US 12,523,479 B1
(45) Date of Patent: Jan. 13, 2026

(54) CONSTRAINT-BASED ROUTE GENERATION IN A RIDE-SHARING SERVICE

(71) Applicant: Transit Labs Inc., Waterloo (CA)

(72) Inventors: Thomas Finn Lidbetter, Kitchener (CA); Clayton Goes, Waterloo (CA); Prem Gururajan, Kitchener (CA); Alexander Bailey, Kitchener (CA); John McElroy, Waterloo (CA)

(73) Assignee: Transit Labs Inc., Waterloo (CA)

( * ) Notice: Subject to any disclaimer, the term of this patent is extended or adjusted under 35 U.S.C. 154(b) by 36 days.

(21) Appl. No.: 18/666,287

(22) Filed: May 16, 2024

(51) Int. Cl.
| | |
|---|---|
| G06Q 50/40 | (2024.01) |
| G01C 21/34 | (2006.01) |
| G06Q 10/02 | (2012.01) |
| G06Q 10/1093 | (2023.01) |
| G06Q 50/43 | (2024.01) |
| G08G 1/00 | (2006.01) |

(52) U.S. Cl.
CPC ........... *G01C 21/343* (2013.01); *G06Q 50/43* (2024.01); *G01C 21/3415* (2013.01); *G06Q 10/02* (2013.01); *G08G 1/202* (2013.01)

(58) Field of Classification Search
CPC .. G08G 1/202; G01C 21/3415; G01C 21/343; G01C 21/3438; G06Q 10/06312; G06Q 10/02
See application file for complete search history.

(56) References Cited

U.S. PATENT DOCUMENTS

| | | | |
|---|---|---|---|
| 10,248,913 B1 * | 4/2019 | Gururajan | G06Q 10/02 |
| 11,429,910 B1 * | 8/2022 | Lidbetter | G01C 21/343 |
| 11,977,393 B2 * | 5/2024 | Nagy | G05D 1/81 |
| 2017/0169366 A1 | 6/2017 | Klein et al. | |
| 2017/0314948 A1 | 11/2017 | Racah et al. | |

(Continued)

FOREIGN PATENT DOCUMENTS

| | | | | |
|---|---|---|---|---|
| CN | 112419716 B | * | 9/2021 | G06Q 10/04 |
| DE | 102019005062 A1 | | 1/2021 | |

(Continued)

OTHER PUBLICATIONS

CN112419716B by Chen J; Layout configuration method for shared single-vehicle facilities in track station transfer influence area; (Year: 2021).*

(Continued)

*Primary Examiner* — Cuong H Nguyen
(74) *Attorney, Agent, or Firm* — Erise IP, P.A.

(57) ABSTRACT

Systems, methods, and computer-readable media for constraint-based itinerary generation in a ride-sharing service are disclosed. Drivers in the ride-sharing service may execute itineraries that include legs, where each leg is defined by a start point and a stop point. The itineraries may be generated in real time in response to ride requests, traffic conditions, and the like. A number of itinerary variations may be generated. Ride requests may include ride tags upon which a ride constraint may be defined. Vehicles may be compared to the ride constraint to determine whether the vehicle satisfies the ride constraint. Vehicles that do not satisfy the ride constraint may be removed from consideration when generating the itineraries, thereby constraining the search space in determining an optimal itinerary.

20 Claims, 8 Drawing Sheets

(56) References Cited

U.S. PATENT DOCUMENTS

| | | | |
|---|---|---|---|
| 2018/0081374 A1 | 3/2018 | Nimchuk et al. | |
| 2018/0189518 A1* | 7/2018 | Batten | G06Q 50/26 |
| 2018/0293521 A1* | 10/2018 | Akselrod | G06Q 50/40 |
| 2018/0315146 A1* | 11/2018 | Matthiesen | G01C 21/3461 |
| 2019/0188608 A1 | 6/2019 | Gururajan et al. | |
| 2019/0258969 A1* | 8/2019 | Akselrod | G06Q 10/025 |
| 2020/0160709 A1 | 5/2020 | Ramot et al. | |
| 2020/0211070 A1* | 7/2020 | Singh | G06Q 30/0284 |
| 2021/0223051 A1* | 7/2021 | Hochberg | G01C 21/3492 |
| 2022/0017121 A1* | 1/2022 | McLean | B60W 50/14 |
| 2022/0126864 A1* | 4/2022 | Moustafa | B60W 60/0011 |
| 2022/0172175 A1* | 6/2022 | Gkiotsalitis | G08G 1/127 |
| 2022/0194415 A1* | 6/2022 | Liu | G06F 16/9024 |

FOREIGN PATENT DOCUMENTS

| | | | | |
|---|---|---|---|---|
| JP | 7351325 B2 * | 9/2023 | | G06Q 10/02 |
| WO | 2018213676 A1 | 11/2018 | | |
| WO | WO-2019023324 A1 * | 1/2019 | | B60N 2/002 |
| WO | WO-2020205597 A1 * | 10/2020 | | B60W 30/182 |
| WO | 2021202851 A1 | 10/2021 | | |
| WO | WO-2024028644 A1 * | 2/2024 | | G01C 21/3415 |

OTHER PUBLICATIONS

Yu, Haining, et al. "PSRide: Privacy-preserving shared ride matching for online ride hailing systems." IEEE Transactions on Dependable and Secure Computing 18.3 (2019): 1425-1440.*

Yu, Haining, et al. "Efficient and privacy-preserving ride matching using exact road distance in online ride hailing services." IEEE Transactions on Services Computing 15.4 (2020): 1841-1854.*

Teusch, Julian, et al. "A systematic literature review on machine learning in shared mobility." IEEE Open Journal of Intelligent Transportation Systems 4 (2023): 870-899.*

Stokkink, Patrick Stefan Adriaan. Optimizing the utilization of existing vehicle flows in last-mile passenger transport and logistics systems. No. 10461. EPFL, 2023. (Year: 2023).*

Hamadneh, Jamil, and Domokos Esztergár-Kiss. "Impacts of shared autonomous vehicles on the travelers' mobility." 2019 6th International Conference on Models and Technologies for Intelligent Transportation Systems (MT-ITS). IEEE, 2019. (Year: 2019).*

Kim, Nam Seok, Byungkyu Park, and Kang-Dae Lee. "A knowledge based freight management decision support system incorporating economies of scale: multimodal minimum cost flow optimization approach." Information Technology and Management 17 (2016): 81-94. (Year: 2016).*

Khadilkar, Harshad. "Solving the capacitated vehicle routing problem with timing windows using rollouts and MAX-SAT." 2022 Eighth Indian Control Conference (ICC). IEEE, 2022. (Year: 2022).*

Pujol, Francisco A., et al. "Blockchain-based framework for traffic event verification in smart vehicles." IEEE Access 12 (2024): 9251-9266 (Year: 2024).*

Pan, James Jie, and Guoliang Li. "Fast and scalable ridesharing search." IEEE Transactions on Knowledge and Data Engineering (Year: 2024).*

Alqaisi, Ala. "Trustworthy Decentralized Last Mile Delivery Framework Using Blockchain." (Year: 2023).*

Leurent, Fabien. "Line Ride-Sharing as a bi-sided mobility service with price schedule, transactional protocol and waiting policy: a logit traffic assignment model and its equilibrium." (Year: 2024).*

European Patent Application 22953362.5 Extended Search Report issued Nov. 5, 2024.

* cited by examiner

CONSTRAINT-BASED ROUTE GENERATION IN A RIDE-SHARING SERVICE

RELATED APPLICATIONS

This patent application shares certain subject matter in common with U.S. Pat. No. 10,248,913 entitled "SYSTEMS, DEVICES, AND METHODS FOR SEARCHING AND BOOKING RIDE-SHARED TRIPS" and U.S. Pat. No. 11,429,910 entitled "DYNAMIC SCHEDULING OF DRIVER BREAKS IN A RIDE-SHARING SERVICE". The above-referenced U.S. Patents are hereby incorporated by reference in their entirety into the present application.

BACKGROUND

1. Field

Embodiments of the present disclosure relate to techniques for route generation in a ride-sharing service. More specially, embodiments of the present disclosure relate to systems, methods, and computer-readable media for constraining a search space to determine an optimal driving route itinerary in a ride-sharing service.

2. Related Art

Ride-sharing services may operate using a set of drivers each assigned to drive an itinerary. The itinerary may include a plurality of legs, and each leg may be defined by a start location and a stop location, such as a pick-up location and a drop-off location. The generation of an optimal itinerary is an optimization problem analogous to the knapsack problem. Dynamically changing conditions, such as new ride requests, traffic and weather conditions, and the like may require the iterative determination of the optimal itinerary in real-time.

The search space in large optimization problems may grow to the point where any method of exploring the search space in feasible time only explores a fraction of the search space. Heuristic methods can be used to ensure the search is focused on sensible areas of the feasible region; however, building custom heuristics for all scenarios is intractable. Enabling a person to shape the search space, for example, via changing the feasible region or adjusting the desirability of certain areas of the search space may overcome some of the drawbacks associated with building custom heuristics. Improvements in exploring the search space for itinerary generation in ride-sharing services are needed.

SUMMARY

Embodiments of the present disclosure solve the above-mentioned problems by providing systems, methods, and computer-readable media for constraint-based itinerary generation in a ride-sharing service. Drivers in the ride-sharing service may be assigned itineraries that comprise a plurality of legs. Itinerary generation may be carried out via an allocation system that generates, for each driver, a plurality of itinerary variants that test various insertions of the rides into different legs of the itinerary. For each itinerary variant, an objective value may be generated, and the itinerary variant with the best objective value may be assigned to the driver.

To constrain the search space, rides may be assigned ride tags upon which ride constraints (also referred to as ride tag rules) are generated. When a new ride request is received, one or more parameters may be associated with the new ride request. The parameters may include the pick-up and drop-off locations and times, an accessibility need, and the like. Ride tags may be assigned based on the ride parameters, such as an 'Accessibility' tag.

Ride tags can be manually assigned by a user, or inferred by service rules that are previously configured, or by a machine learning algorithm using historical data, or interpreted/determined by a large language model that is interpreting a user's specific request or need, or any combination thereof.

Based on the ride tags, a ride constraint may be defined. The ride constraint may be a set of logical operators used to define conditions that must be met by a vehicle for the vehicle to serve the ride, or not meeting the ride constraint may penalize the itinerary generation for the vehicle to make it less likely the vehicle is assigned to the ride. For example, the ride constraint may require a vehicle assigned to either a zone containing the pick-up location or a zone containing the drop-off location and the vehicle to be wheelchair accessible. Vehicles may have vehicle tags that are compared to the ride constraint to determine whether the vehicle satisfies the ride constraint. Thus, if the pick-up location is in a zone A and the drop-off location in a zone B, the ride constraint may be defined as requiring: (zone A vehicle OR zone B vehicle) AND (Accessible vehicle). The ride constraint may also include negative tags (e.g., NOT zone A vehicle)

A ride constraint data structure may be associated with the ride constraint for a ride and may comprise any combination of the following fields: vehicle whitelist field, a vehicle blacklist field, a ride whitelist field, and a ride blacklist field. The vehicle whitelist and blacklist fields may include zero or more vehicle identifiers associated with a vehicle, and the ride whitelist and blacklist fields may include zero or more ride identifiers associated with other rides in the ride-sharing service. The vehicle whitelists and blacklists may govern which rides may be assigned to which vehicles, while the ride whitelists and blacklists may govern which riders may share a vehicle with each other. Vehicle identifiers of vehicles that satisfy the ride constraint may be added to the vehicles whitelist. Vehicle identifiers of vehicles that meet a negative ride constraint may be added to the vehicle blacklist. Vehicles in the blacklist may not be allowed to serve the ride. If a vehicle does not meet the ride constraint, the vehicle identifier may be left out of the ride constraint data structure, which may also prevent (or lower the chances) of that vehicle being assigned to the ride. Similarly, ride identifiers of rides that satisfy the ride constraint may be added to the ride whitelist and may be allowed to share a vehicle with the ride associated with the ride constraint. Ride identifiers of rides that meet a negative ride constraint may be added to the ride blacklist and may be prevented from sharing a vehicle with the ride associated with the ride constraint. For example, if a first ride is in the blacklist of a second ride, the first ride cannot share a ride with the second ride and must be serviced by a different vehicle). If a ride does not meet the ride constraint, the ride may be left out of the ride constraint data structure. The ride constraints may cause the removal of non-conforming itineraries from the search space.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1:
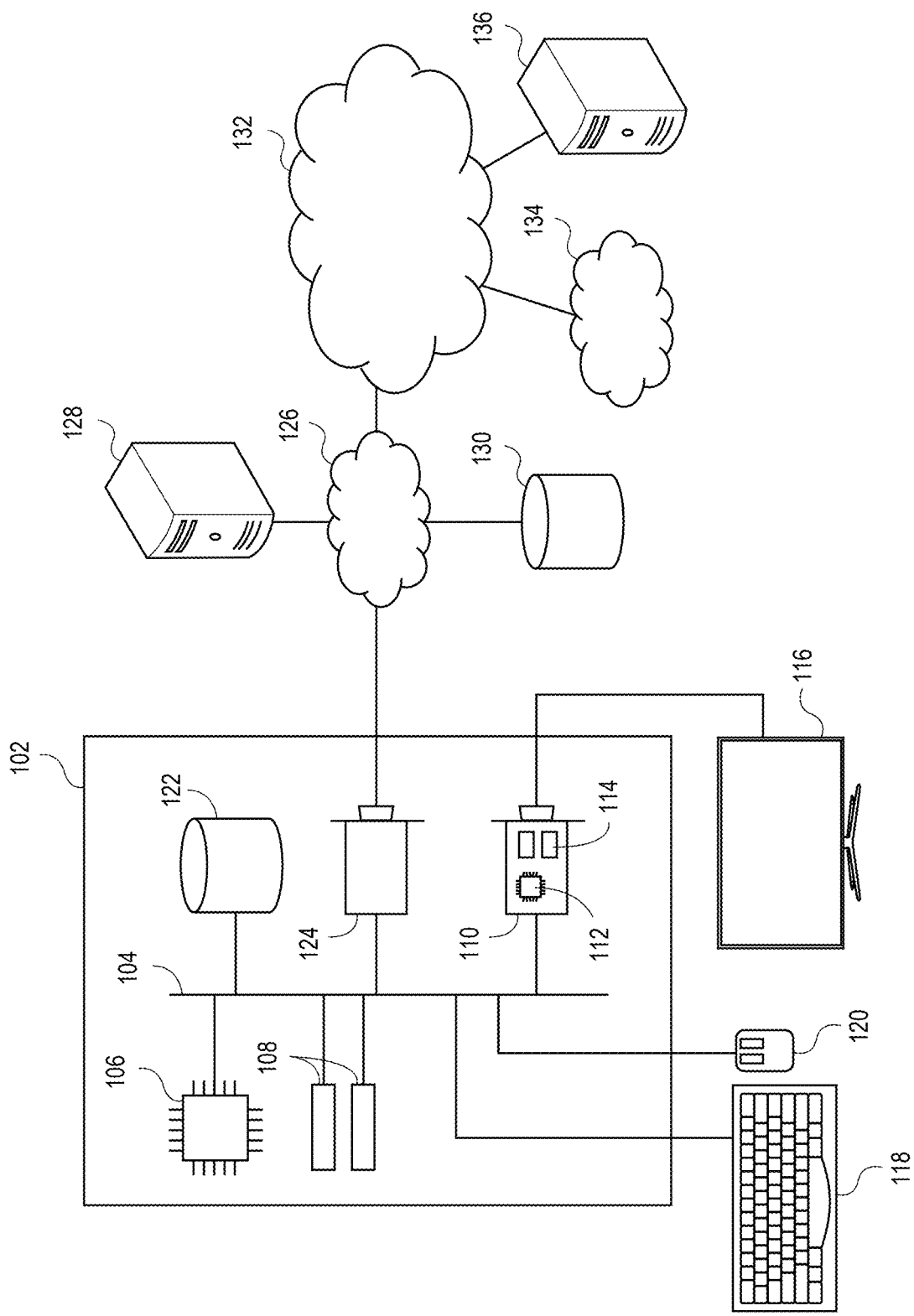
FIG. 1 illustrates an exemplary hardware architecture for some embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments of the present disclosure are generally related to systems, methods, and computer-readable media for generating ride share itineraries in a ride-sharing service based on one or more constraints to reduce/constrain the problem search space. The ride-sharing service may operate with a plurality of drivers adhering to an itinerary generated by the ride-sharing service. The itinerary may comprise a plurality of legs, each leg having a start point and a stop point, such as a passenger pick up and a passenger drop off or a combined passenger pick-up and drop-off. Each itinerary may be associated with a vehicle that drives the itinerary legs.

For obtaining the ride-sharing itineraries, an allocation system may generate a plurality of itinerary variants, compute an objective value for each itinerary variant, and select the itinerary variant with the highest objective value as the itinerary executed by the driver. For each itinerary variant, an objective formula may be computed to obtain an objective value, which may minimize or maximize one or more parameters, such as travel time, travel distance, number of legs, or the like. In real time due to changing conditions, such as weather, traffic, new ride requests, ride cancellations, etc., the allocation system may iteratively determine an optimal itinerary for each vehicle and cause communication of the itinerary changes to the drivers if a new optimal itinerary is obtained. For example, due to a traffic accident, the allocation system may determine a future ride pick-up is better served by a different vehicle and may adjust the itineraries of each vehicle accordingly.

Rides may comprise or otherwise be associated with ride tags, which may be used to define one or more ride constraints (also referred to as ride tag rules) that may be adhered to or must be adhered to by the allocation system in the itinerary generation. For example, a ride constraint for a passenger needing a wheelchair-accessible vehicle may force the allocation system to assign that ride to a wheelchair-accessible vehicle. Vehicles that are not wheelchair-accessible may be removed from the search space when generating and optimizing itineraries to serve the ride.

Ride constraints may have a ride constraint data structure comprising a vehicle whitelist, a vehicle blacklist, a ride whitelist, and a ride blacklist in some embodiments. The vehicle whitelist may comprise a set of vehicle identifiers identifying vehicles that may serve the ride. Conversely, the vehicle blacklist may comprise a set of vehicle identifiers identifying vehicles that are precluded from serving the ride. Ride identifiers identifying other rides being serviced by the ride-sharing service may be added to the ride whitelist or ride blacklist to govern sharing rides with other passengers.

As discussed, the determination of an optimal itinerary is a large-scale search space optimization problem. Accordingly, by applying one or more constraints to the rides, thereby constraining the itinerary generation, the search space may be reduced, which may lead to reduced processing time to obtain an optimal itinerary. Therefore, the allocation system may converge to a solution in a reduced time frame.

FIG. 1 illustrates an exemplary hardware platform relating to some embodiments of the present disclosure. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Such non-transitory computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth®, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

System Overview

Figure 2:
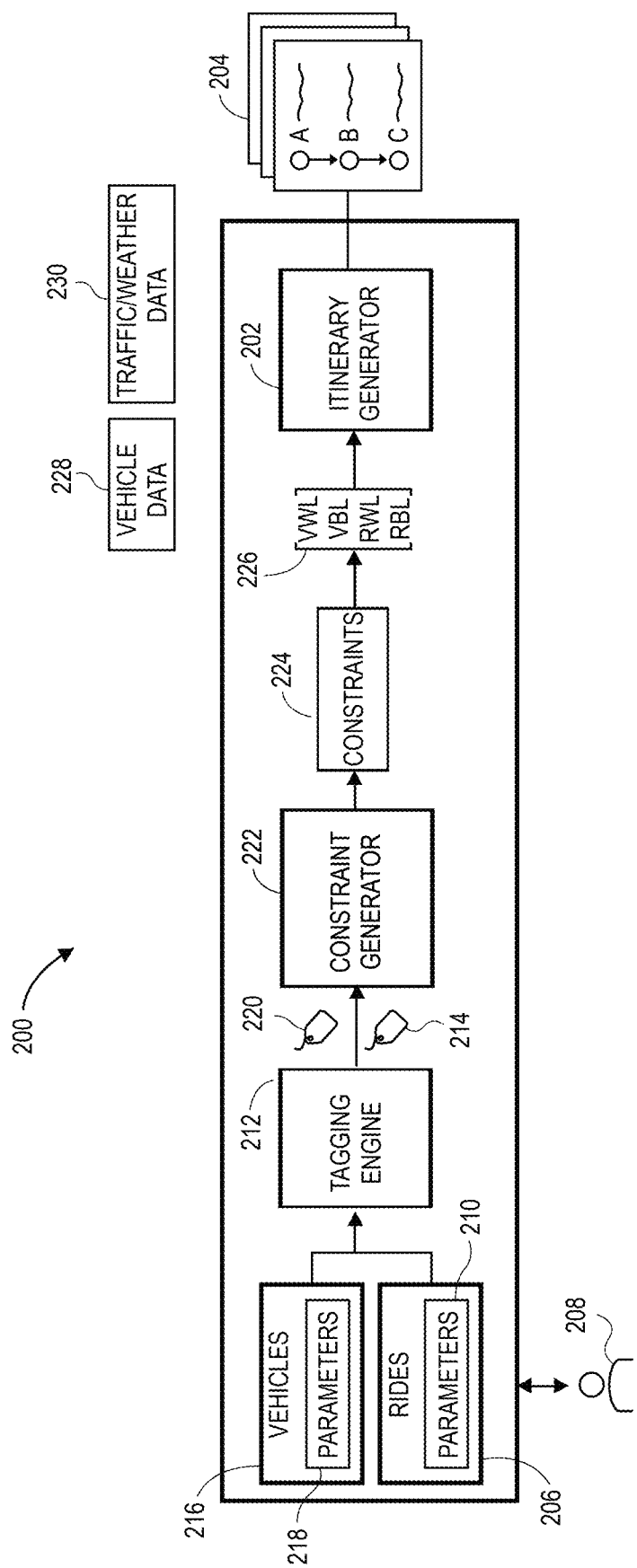
FIG. 2 illustrates a schematic diagram for some embodiments.

FIG. 2 illustrates an overview of an allocation system 200 in accordance with aspects of the present disclosure. Allocation system 200 may comprise an itinerary generator 202 configured to generate itineraries 204. An itinerary 204 may be associated with a vehicle and may comprise a plurality of legs as previously discussed.

The itinerary generator 202 may receive ride requests 206, which may be provided by a user 208. The user 208 may be the ride passenger, or an operational user (e.g., overseeing the operations of allocation system 200), or the like. The ride request 206 may include various ride parameters 210 such as: pick-up/departure time, pick-up location, drop-off/arrival time, drop-off location, ride type (e.g., paratransit), seating preferences, a delay tolerance, and the like. In some embodiments, the delay tolerance defines an acceptable excess time or distance incurred from utilizing the ride-sharing service as compared to the passenger driving the trip themselves. It will be appreciated the pick-up and drop-off times may take various forms, such as an arrive-before time or a pick-up after time, or may define a time window, or the like.

Figure 3:
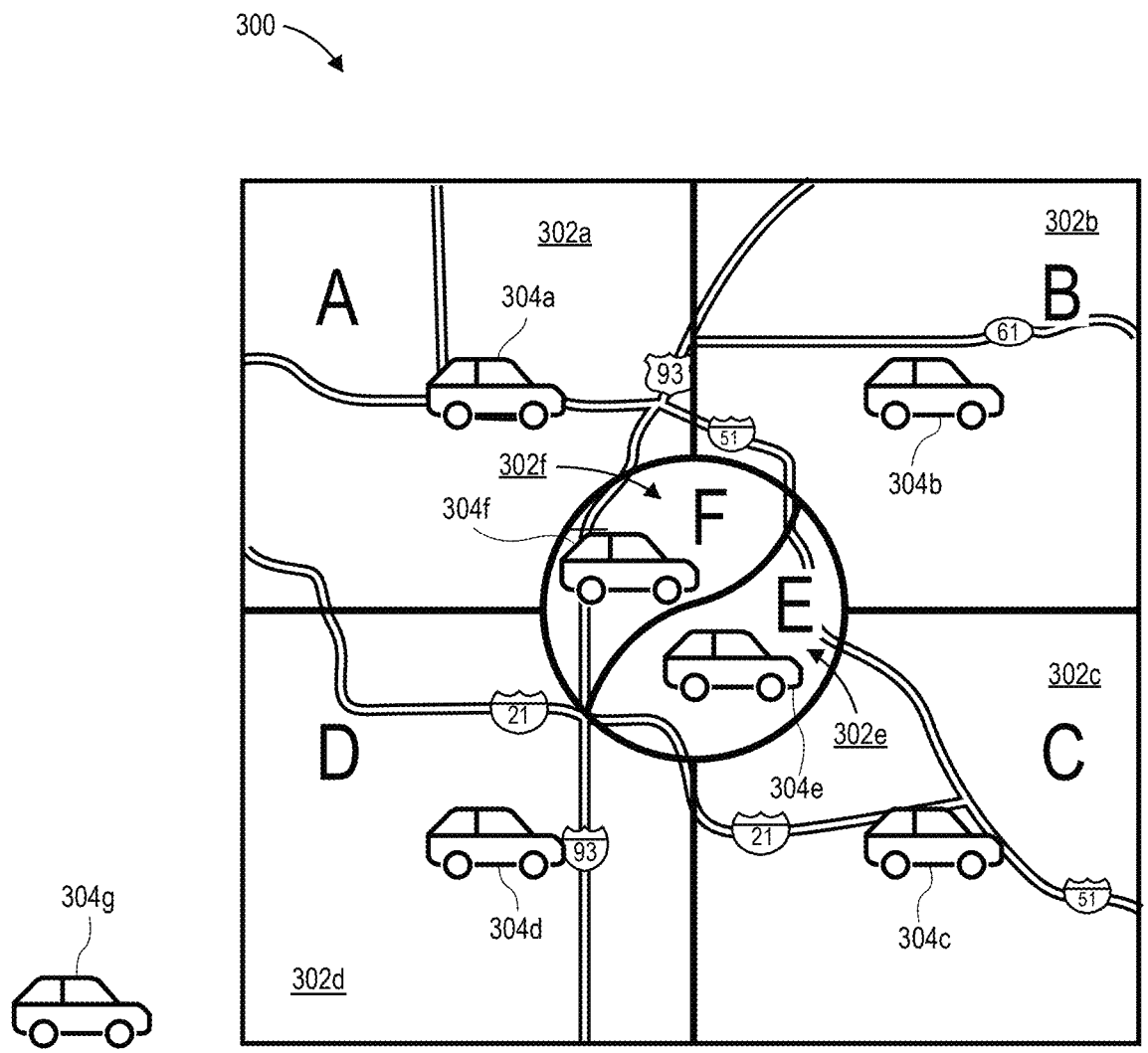
FIG. 3 illustrates an example service area for a ride-sharing service for some embodiments.

The ride parameters 210 may be passed to a tagging engine 212. Tagging engine 212 may be configured to define one or more ride tags 214 for the ride request 206 based at least in part on the ride parameters 210. In some embodiments, a ride tag 214 is based on at least one of the pick-up location or the drop-off location. Referring briefly to FIG. 3, in some embodiments, vehicles in a service area are assigned to a zone 302a, 302b, 302c, 302d, 302e, 302f, such as the zones A-F illustrated. Accordingly, for a ride request 206 with a pick-up location in zone A and a drop-off location in zone C, a ride tag 214 may comprise a zone A tag and a zone C tag.

The ride tags 214 may also be based on passenger-specific parameters. For example, if the passenger requires wheelchair-accessible seating, an accessibility tag 214 may be created. As another example, if the passenger requires the vehicle driver to speak a certain language, the language may be a tag 214 (e.g., a Language-Spanish tag). Generally, any constraint on the ride may be configured as a tag 214. As yet another example, the passenger may require transportation to a location that requires the driver to have certain credentials or authorization to enter (e.g., a military base). Accordingly, the credential level of the driver may be a tag 214. In some embodiments, the ride parameters 210 are set automatically by allocation system 200, e.g., based on a user profile or past user activity in allocation system 200. In some embodiments, the parameters 210 are configured manually by the user 208. As another example, the medium through which the ride was booked may be used to define a ride tag 214. For example, the allocation system 200 may be provided as an application and/or website for both a first group (e.g., a city government) and a second group (e.g., an organization), and rides booked through the first group may have a first ride tag different from a second ride tag for rides booked with through the second group.

Vehicles 216 operating in the ride-sharing service may also have vehicle parameters 218 that are communicated to tagging engine 212 for generation of vehicle tags 220. The vehicle tags 220 may be based on the vehicle parameters 218, which may include vehicle type (e.g., accessible, sedan, etc.), number of seats, vehicle fleet, the vehicle driver (e.g., language(s) spoken by the driver, credentials/authorization of the driver), and the like. In some embodiments, vehicles 216 are associated with a specific vehicle fleet and there may be more than one fleet operating in the service area 300 at a given time such that vehicles may be tagged with their vehicle fleet. In some embodiments, vehicle parameters 218 can be assigned to a vehicle fleet, and the vehicle parameters 218 may be inherited by each vehicle 216 operating in the fleet. Similarly, vehicle parameters 218 may be assigned to a vehicle provider or to the vehicle driver, and the vehicle parameters for a specific vehicle may be inherited from those parameters 218 assigned to a provider or driver. Thus, for example, if the vehicle provider provides a plurality of vehicles for the ride-sharing service, each vehicle provided by the provider may have the same parameters 218 without having to configure parameters individually for each vehicle. Similarly, vehicles may inherit parameters 218 from the driver such that each vehicle driven by the driver may have the same parameters 218 (or at least a subset of the same parameters). In some embodiments, parameters 218 are inherited and/or determined based on the ride request 206. It will be appreciated that the vehicle tags 220 may be based on parameters 218 from multiple sources, e.g., both vehicle parameters 218 inherited from the driver (e.g., Language-Spanish) and from the vehicle fleet (e.g., wheelchair accessible) may be used to determine tags 220. The vehicle tags 220 may also be determined based on one or more zones or regions of the service area the vehicle is assigned to.

A constraint generator 222 may receive the tags 214, 220 from tagging engine 212 and generate a ride constraint 224 for the ride request 206. The ride constraint 224 may be based on the ride tags 214 and/or the vehicle tags 220. In some embodiments, the ride constraint 224 is associated with be a ride constraint data structure 226 comprising any combination of the following fields: vehicle whitelist (VWL), vehicle blacklist (VBL), ride whitelist (RWL), or ride blacklist (RBL). The vehicle whitelists and blacklist fields may comprise one or more vehicle identifiers associated with a vehicle 216, and the ride whitelist and blacklist fields may comprise one or more ride identifiers associated with other rides in the ride-sharing service.

The generation of ride constraint 224 may be based on the ride tag 214 for the ride request 206, the vehicle tags 220 for all or a subset of the vehicles 216 in the ride-sharing service, ride tags 214 of other rides, or any combination thereof. More specifically, vehicle tags 220 may be compared against the ride constraint 224 to determine if the rule is satisfied. For example, where the ride constraint 224 requires a zone A tag 214 the ride constraint 224 may require a vehicle with a zone A vehicle tag 220. Similarly, if a ride constraint 224 requires a Spanish-speaking driver, the ride constraint 224 may require a vehicle 216 with a Language-Spanish vehicle tag 220. Thus, a vehicle 216 that has both a zone A vehicle tag 220 and a Language-Spanish tag 220 may be determined to satisfy the ride constraint 224 and added to the vehicle whitelist. Those vehicles that do not satisfy the ride constraint 224 may be left out of the vehicle whitelist.

It will be appreciated that a ride constraint 224 may be based on multiple tags 214 such that a ride constraint 224 may itself comprise multiple separate ride constraints 224, which may be expressed using a conjunction of disjunctions or a disjunction of conjunctions. For example, the ride constraint 224 may require: (A OR B) AND (C OR D) or, similarly, (A AND B) OR (C AND D). As a more concrete example, a first ride tag 214 may be a zone A tag, a second ride tag 214 may be a zone C tag, a third ride tag 214 may be an Accessible tag, and a fourth ride tag 214 may be a Language-Spanish tag 214. The ride constraint 224 may require a vehicle 216 to satisfy the following: (zone A OR zone C) AND (Accessible) AND (Language-Spanish). Vehicles that satisfy this constraint 224 may then be added to the vehicle whitelist. Other logical operators (e.g., XOR, NOT, etc.) may be used in defining the ride constraint 224. As another example, the constraint 224 may be expressed as a disjunction of conjunctions, e.g., (zone A AND zone C) OR (Vehicle Fleet A AND Accessible).

As discussed above, the ride constraint data structure 226 may comprise both a vehicle blacklist and a ride blacklist. In some embodiments, the NOT operator is used to cause a vehicle 216 or ride to be added to a blacklist. For example, the ride parameter 210 may indicate the user 208 does not want the vehicle 216 to be a truck, and therefore, a ride tag 214 indicating such may be created, which in turn may cause the ride constraint 224 to be defined as: (NOT Truck). Vehicles 216 that do not satisfy this constraint 224 (i.e., are trucks) may then be added to the vehicle blacklist in ride constraint data structure 226. In some embodiments, vehicles that satisfy (NOT Truck) are any vehicles 216 not having a truck vehicle tag 220, each of which may be added to the vehicle whitelist.

The vehicle whitelist may govern itinerary generation for serving the ride request 206. That is, in some embodiments, only vehicles 216 in the vehicle whitelist may be considered to serve the ride request 206. In some embodiments, the whitelist may be empty. In some such embodiments, the blacklist may be examined to determine any vehicles 216 that are in the blacklist and prevent assignment of those vehicles 216 to the ride request 206, while allowing any other vehicles 216 to serve the ride request 206. The ride whitelist and blacklists may work in a similar manner. If there are any rides (i.e., ride identifiers) in the ride whitelist, those rides may share a ride with the ride request 206, and if the ride whitelist is empty, the ride blacklist may be consulted to determine any rides that should be prevented from sharing a ride with the ride request 206. The use of the whitelists and blacklists enables the search space to be constrained, thereby enabling an optimal itinerary 204 to be more quickly determined. Once the ride constraint data structure 226 for the ride request 206 is determined, a plurality of itinerary variants may be generated to determine an optimal itinerary to service the ride.

In some embodiments, constraints 224 may be imposed on a per-seat basis as opposed to an entire vehicle. Thus, for example, if a vehicle 216 has a single accessible seat, such a constraint 224 could prevent assignment of multiple accessible rides to the vehicle 216 by applying the constraint 224 to the single seat. When the single accessible seat is filled, the ride identifier for the ride assigned to the accessible seat may be added to the blacklist of other ride requests needing an accessible seat to prevent assigning two accessible rides to the single seat.

An overview of itinerary generation will now be discussed, which will be useful in understanding the concepts discussed herein. Itineraries 204 may be generated both for future rides and in real-time as new ride requests 206 are received. For example, ride requests may be received days in advance of when the ride is scheduled, and itinerary generator 202 may generate itineraries 204 for future trips. Additionally, ride requests 206 may be received in real-time such that the itinerary generator 202 may dynamically reconfigure an itinerary to service the new ride request. Real-time generation/modification of itineraries may additionally be based on various external factors, such as vehicle data 228 (e.g., GPS data, fuel/charge level, etc.) and traffic/weather data 230. For example, traffic/weather data 230 may indicate an accident is causing a 30-min slowdown impacting a vehicle's ability to meet a pick-up time, which may cause itinerary generator 202 to modify one or more in-service itineraries 204 to assign the ride to a vehicle 216 not impacted by the accident.

In some embodiments, the itineraries 204 comprise a plurality of indices, each index corresponding to a time slot, which may be spaced in intervals, such as every five minutes. An itinerary leg may occupy two or more indices in the itinerary 204. Itinerary generator 202 may generate a plurality of itinerary variants that modify one or more parameters of the rides in the itinerary 204.

Each itinerary 204 may be associated with a vehicle 216. Accordingly, an itinerary variant for a vehicle may move the pick-up time for a ride from 10:00 am to 10:10 am. Insertion of rides into indices of an itinerary may be done using various insertion methods, such as a greedy insertion heuristic, a regret insertion heuristic, or other heuristic.

For each itinerary variant, an objective value may be computed. The objective value may be based on various metrics, such as a number of legs of the itinerary 204, cost per passenger mile, total vehicle driving time, total vehicle driving distance, a metric of relative delay, or the like. The metric of relative delay may be based on a time incurred for the passenger's trip as compared to the passenger making the trip themselves. The itinerary 204 with the best objective value may then be selected to serve the ride. Further details on itinerary generation can be found in U.S. Pat. Nos. 10,248,913 and 11,429,910, which are incorporated by reference in their entireties.

Generating itineraries 204 based on constraints 224 will now be discussed. In some embodiments, itinerary generator 202 generates itineraries 204 based on the constraint 224 such that the ride can only be served by a vehicle 216 in the vehicle whitelist of the ride constraint data structure 226. Further, the ride request 206 may only share a ride with a ride identifier in the ride whitelist. Vehicles 216 in the vehicle blacklist and rides in the ride blacklist may be prohibited from serving/sharing a ride associated with the ride request 206. The blacklists may be used in the event that the whitelists are empty. That is, itinerary generation may be governed by the whitelists only; however, if a whitelist is empty, the blacklists may prevent ride assignment to vehicles/rides in the blacklist.

In some embodiments, constraints 224 impose hard constraints on the itinerary generator 202. When hard constraints are imposed, vehicles 216 that do not satisfy the ride constraints 224 (i.e., are not in the vehicle whitelist or are in the vehicle blacklist) may be removed from the search space. Thus, potential itineraries 204 for those vehicles 216 to serve the ride are not computed. Constraining the search space in such a way may reduce processing time to locate an optimal itinerary 204.

In some embodiments, constraints 224 impose soft constraints on the itinerary generator 202. When soft constraints are imposed, potential itineraries 204 may be generated for vehicles 216 that do not satisfy the ride constraint 224; however, these vehicles 216 may be penalized when computing the objective value. Accordingly, the soft constraints may force or bias the itinerary generation to select a vehicle 216 that meets the ride constraint 224; however, in the event the vehicles 216 that meet the ride constraint 224 are unable to serve the ride for some reason, non-conforming vehicles 216 may still be allowed to serve the ride. As an example, referring again to FIG. 3, if a ride is from zone A to zone C such that a vehicle 216 tagged with either a zone A tag or a zone C tag should serve the ride, but all vehicles 216 with the zone A or zone C tags are unavailable (or cannot serve the ride based on the other parameters such as pick-up time and drop-off time), a vehicle 216 with a zone D tag may serve the ride. When computing the itinerary for the zone D vehicle, the objective value thereof may be penalized because the vehicle does not meet the constraint 224, but this objective value may still be the best objective value because the itineraries for the zone A and C vehicles may not be valid.

In some embodiments, the ride constraints 224 may comprise a combination of hard constraints and soft constraints. For example, a ride constraint 224 requiring an accessible vehicle and a Spanish-speaking driver may impose a hard constraint on the accessible vehicle and a soft constraint on the driver language. In some embodiments, whether a constraint is a hard constraint, a soft constraint, and/or the penalty value of violating a soft constraint are user configurable.

In some embodiments, allocation system 200 is implemented using any of the computing hardware described with respect to FIG. 1. In some embodiments, allocation system 200 is implemented using a distributed computing architecture. In some embodiments, operations of allocation system 200 are carried out using a parallel processing system. For example, generation of itineraries 204 may be carried out by multiple distinct processors running in parallel, with each processor generating a subset of the itineraries 204. Other parallel processing techniques (e.g., using separate threads or cores on the same processor) are within the scope hereof.

FIG. 3 depicts an exemplary scenario of how a ride-sharing service area 300 may be divided into a plurality of regions or zones 302a, 302b, 302c, 302d, 302e, 302f and how ride constraints may be generated based on the regions. In some embodiments, drivers of the ride-sharing service are assigned to a zone 302a, 302b, 302c, 302d of the service area 300. For example, a first vehicle 304a may be assigned to first zone 302a (zone A), a second vehicle 304a may be assigned to second zone 302b (zone B), and so on. In some embodiments, vehicles are assigned to multiple zones, or may be assigned to no zones (i.e., equivalent to being assigned to all zones). While a single vehicle is shown per zone, it will be appreciated that more than one vehicle may be assigned to a zone. Additionally, vehicles assigned to the same zone may each have differing zone assignments. That is, a first vehicle may be assigned solely to zone A, while a second vehicle may also be assigned to zones A, B, and F.

In some embodiments, a vehicle may be assigned to a "home" zone. In some embodiments, vehicles are assigned a home zone and to secondary zones, such as zones neighboring the home zone. For example, the home zone for vehicle 304a may be zone A, and vehicle 304a may also be assigned to neighboring zones B, D, and F. In some embodiments, soft constraints are imposed on the secondary zones such that rides in the secondary zone may be penalized in the objective formula for itinerary generation to encourage the vehicles to remain within their primary zones. For example, the vehicle 304a may have a primary zone A and secondary zones B and F. If a ride request for zones B or F is received, vehicle 304a meet the ride constraint 224 by having the B or F tag; however, a penalty may still be imposed because the B and F zones are secondary zones. However, the penalty may be less as compared to a vehicle that is not assigned to zones B or F.

As previously discussed, vehicles may have vehicle parameters 218. The assigned zone may be a vehicle parameter 218 and, accordingly, each vehicle 304a, 304b, 304c, 304d, 304e, 304f may have a vehicle tag 220 determined based on their respective zone 302a, 302b, 302c, 302d, 302e, 302f such that first vehicle 304a may have a vehicle tag 214 for zone A, second vehicle 304b may have a vehicle tag 214 for zone B, and so on. If the vehicle is assigned to more than one zone, the vehicle may have a vehicle tag 214 for each zone (e.g., an 'AB' tag when assigned to zones 302a, 302b). A ride tag 214 may be determined based on the pick-up and drop off location of the ride request 206. Thus, for example, if a ride has a pickup location in first zone 302a and a drop off location in third zone 302c, the ride tag 214 may have a tag AC. Accordingly, the ride constraint 224 for the ride from first zone 302a to third zone 302c may include vehicles with either the 'A' tag or the 'C' tag in the vehicle whitelist such that the itinerary generation is constrained to those vehicles. In some embodiments, vehicles can serve neighboring zones such that the ride tag for a pick-up location in a zone may include a tag for the pick-up zone and all zones neighboring the pick-up zone. For example, a pick-up in zone A may cause generation of a ride tag 214 of zones ABDF.

As discussed above, the ride constraint 224 may be a soft constraint such that itineraries 204 may be generated that violate the ride constraint 224. Itineraries 204 that violate the ride constraint 224 may be penalized, thereby negatively affecting the objective value. Such a soft constraint may be used, for example, when the ride cannot otherwise be served. For example, if both vehicles 304a, 304c are unavailable to serve the ride from first zone 302a to third zone 302b, another vehicle 304b, 304d, 304e, 304f may be assigned to serve the ride. By employing the soft constraint and penalizing the itinerary generation for the out-of-zone vehicles 304b, 304d, 304e, 304f, the ability to serve rides is still provided in the event the vehicles 304a, 304c that meet the ride constraint 224 are otherwise unable to serve the ride. In such a scenario the non-conforming vehicles 304b, 304d, 304e, 304f may still have an itinerary 204 with the best objective value for serving the ride request 206 despite the penalty imposed on the objective formula. In some embodiments, the best objective value is one of a highest (or maximized) objective value or a lowest (or minimized objective value) or the best objective value may be selected based on any other criteria. When the conforming vehicles 304a, 304c can serve the ride request 206, the objective values of the vehicles' 304a, 304c itineraries 204 are likely to be higher than vehicles 304b, 304d, 304e, 304f because a penalty is not imposed.

As another example, the soft constraints may enable a vehicle to serve a ride request when the vehicle returns to a home zone. For example, if vehicle 304a is returning from zone C, and a ride request 206 for a ride from zone E to zone F was received, the ride request 206 may be assigned to the first vehicle 304a because it is known the vehicle 304a will pass through the intermediary region and, accordingly, it may be optimal for vehicle 304a to service the ride. This may be handled in various ways. As one example, it is contemplated that the vehicle 304a may have dynamic zone tags such that vehicle 304a may temporarily be assigned zone E and F tags because, by knowing the location of vehicle 304a, it may be known vehicle 304a will travel through zones E and F when returning to zone A. However, to encourage vehicle 304a to return to home zone A, a penalty may still be imposed on rides assigned to vehicle 304a that have the zones E and F tags. As previously discussed, allocation system 200 may receive real time vehicle data 228 such that the position of each vehicle may be monitored and used to influence the itinerary generation as new ride requests are received. As another example, the ride from zone E to zone F may be assigned to vehicle 304a by penalizing the objective formula based on a travel distance, or a time out of zone, or the like, such that vehicle 304a may incur the lowest penalty value as compared to the other vehicles 304b, 304c, 304d that would have to travel further or spend more time out of their home zones. The previous examples assume that the vehicles 304e, 304f assigned to zones E and F, respectively, are unable to handle the ride request 206 from zone E to zone F for some reason.

Various other soft constraints may be imposed. As yet another example, a soft constraint could enable a vehicle to service rides within a non-home zone after the vehicle has performed a drop-off in that zone even if the vehicle does not have the tag for the zone. For example, first vehicle 304a could serve zones within third zone 302c after performing a drop off within the zone 302c, such as if a new ride request 206 is received while first vehicle 304a is within the third zone 302c. As discussed above, the soft constraint may penalize the objective value such that, upon receipt of the new ride request, itinerary generator 202 may attempt to assign the ride to the vehicle 304c for the zone 302c; however, the soft constraint may allow the ride to be served by first vehicle 304a if the itinerary for vehicle 304a with the ride inserted has a more optimal objective value than the itinerary for vehicle 304c with the ride inserted.

In some embodiments, the ride-sharing service operates with one or more emergency or rescue vehicles 304g. A rescue vehicle 304g may be a vehicle without a designated zone and may or may not be in-service with the other vehicles 304a, 304b, 304c, 304d, 304e, 304f. Thus, in some embodiments, the vehicle tag 214 for one or more standby vehicles 304g is all zones (e.g., 'ABCDEF') or the vehicle tag 214 may be empty. The rescue vehicle 304g may be automatically requisitioned to service a ride based on various factors. The rescue vehicle 304g may be automatically brought into service, for example, if itinerary generator 202 is unable to service a ride with the in-service vehicles 304a, 304b, 304c, 304d, 304e, 304f. For example, if the ride cannot be served without exceeding an unacceptable delay or is at risk of being cancelled due to being unable to be served, the rescue vehicle may be employed to service a ride impacted by the delay. In some embodiments, an operational user can deploy a rescue vehicle, as discussed further below with respect to FIG. 5B. In some embodiments, the rescue vehicle 304g is automatically deployed in response to determining a ride cannot be serviced or is at risk of being unacceptably late (e.g., 15 or 30 minutes late and for which the time period may be set by the user). In some embodiments, a user can define a time period that is considered unacceptably late to thereby cause deployment of a rescue vehicle. In some embodiments, an alert is generated automatically in response to determining the ride cannot be serviced or is at risk of being unacceptably late.

Methods

Figure 4A:
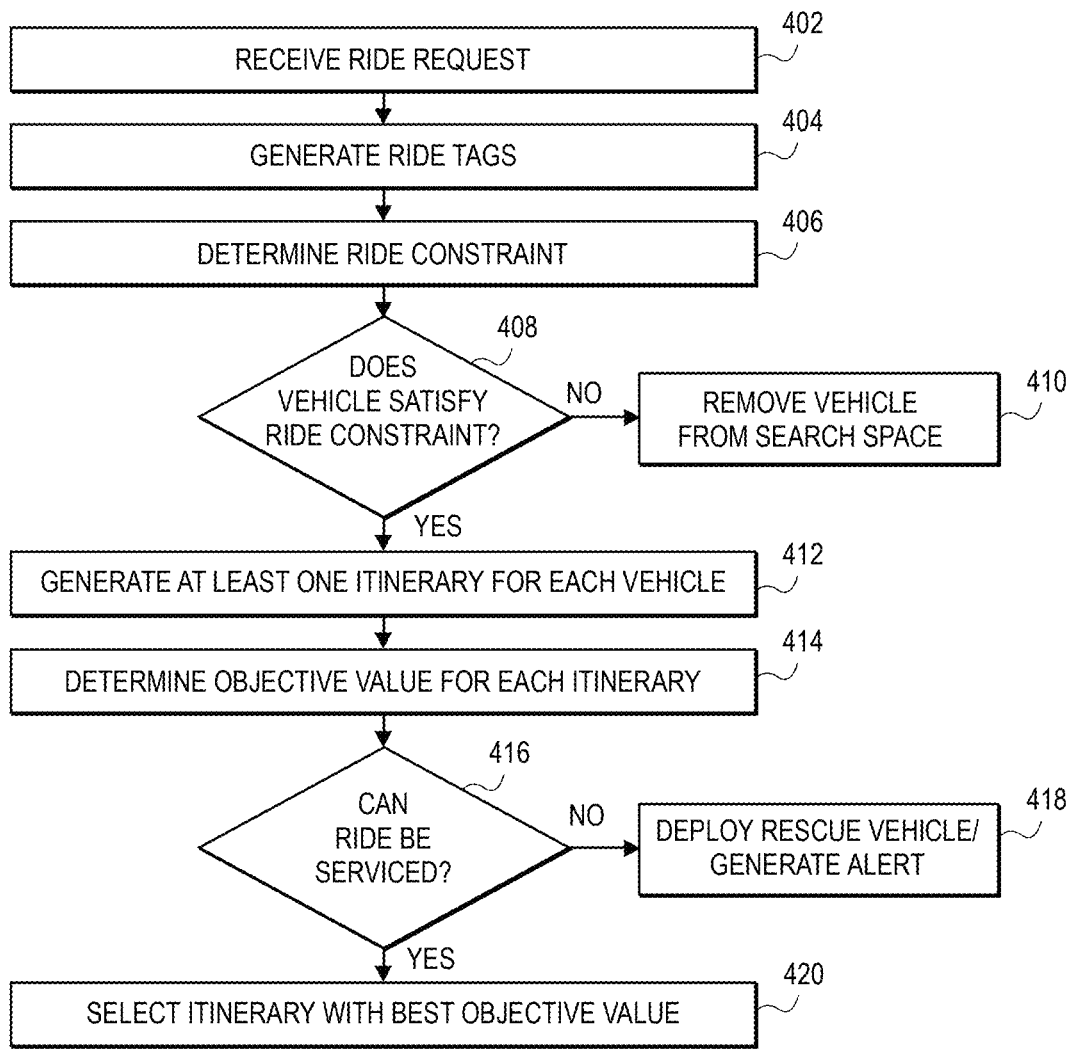
FIG. 4A illustrates a method of itinerary generation employing hard constraints for some embodiments.

FIG. 4A illustrates an exemplary method 400 in which hard constraints may be enforced for itinerary generation in accordance with aspects of the present disclosure. At step 402, a ride request 206 may be received. The ride request 206 may comprise a pick-up location, a pick-up time, a drop-off location, a drop-off time, along with passenger-specific parameters, such as an accessibility need, a driver language preference, and the like. As discussed further below with respect to FIG. 5A, the user may be able to manually input parameters 210 for the ride request 206.

Next, at step 404, the ride tags 214 for the ride request 206 may be generated. In some embodiments, the ride tags 214 include at least a first ride tag 214 corresponding to the pick-up location and a second ride tag 214 corresponding to the drop-off location. The first tag 214 and the second tag 214 may be the same, for example, when the ride request is for an intra-zone ride. The ride tags 214 may include various other tags generated based on the parameters 210, the user 208 making the request 206 (e.g., a user profile), and other factors as discussed herein.

Thereafter, at step 406, the ride constraint 224 for the ride request 206 may be generated based on the ride tags 214 and the vehicle tags 220. The ride constraint 224 may be used to assign vehicle and ride identifiers to a ride constraint data structure 226, which may comprise a vehicle whitelist, a vehicle blacklist, a ride whitelist, and a ride blacklist. In some embodiments, the ride request 206 is only able to be served by vehicles 216 in the vehicle whitelist and only able to share rides with rides in the ride whitelist. In some embodiments, if either whitelist is empty, the corresponding blacklist may control vehicles or rides that cannot be associated with the ride. Determining which vehicle/rides to add to the whitelist/blacklist may be based on evaluating the vehicle tags 220 of a vehicle to the ride constraint 224 or the ride tags 214 of other rides to the ride constraint 224. If the tags 214, 220 matches those of the ride request, the identifier of the respective vehicle/ride may be added to the whitelist.

Processing may then proceed to itinerary generation and selection. First, at test 408, for each vehicle 216, it may be determined whether the vehicle 216 satisfies the ride constraint 224. Determining whether the vehicle 216 satisfies the ride constraint 224 may be based on the following: if a vehicle or ride is in the whitelist, the constraint 224 is satisfied; if a vehicle or ride is not in the whitelist or is in the blacklist, the constraint 224 is not satisfied. If not, those itineraries may be removed from further processing in trying to service the ride at step 410. As previously discussed, constraining the itinerary generation may lead to reduced processing time in searching for an optimal itinerary.

If, at test 408, the vehicle does satisfy the ride constraint 224, at least one itinerary 204 may be generated with the ride inserted into a leg of the itinerary 204 at step 412. In some embodiments, a plurality of itinerary variations is generated, each of which may vary one or more parameters of the ride request 206 in an attempt to obtain an optimal itinerary 204. As one example, if the ride request 206 had a ride parameter 210 indicating a pick-up time of 10:00 am, one variation may instead schedule the pick-up at 10:10 am, which may improve the objective value relative to the itinerary variant based on the 10:00 am pick-up time. Generally, any variation of the ride request 206 may be made when generating itinerary variants. In some embodiments, the itinerary variants are generated based on a "seed ride", which may be an itinerary 204 that conforms to the ride parameters 210 (or a subset thereof, such as the pick-up time and location and the drop-off time and location).

Next, at step 414, the objective value may be computed for each generated itinerary, which may include a seed itinerary 204 for each vehicle 216 that satisfied the ride constraint as determined at test 408 and any variations of those itineraries 204. The objective value may be the output of the objective formula, which is discussed in further detail in U.S. Pat. No. 10,248,913.

Thereafter, processing may proceed to optional test 416, where it may be determined whether the ride request 206 can be serviced. For example, if no itineraries 204 are able to meet the ride parameters 210 without violating the ride parameters 210, it may be determined the ride request 206 cannot be serviced. If no, processing may proceed to step 418 where a rescue vehicle 304g may be deployed and/or an alert or other corrective action may be generated. In some embodiments, test 416 is optional such that processing may proceed directly to step 420.

Lastly, at step 420, the optimal itinerary 204 may be selected to service the ride, and the details thereof may be communicated to the vehicle driver, the passenger, and any other personnel. The optimal itinerary 204 may be the itinerary 204 with the best objective value. In some embodiments, the best objective value is a maximized objective value. In some embodiments, the best objective value is a minimized objective value.

Figure 4B:
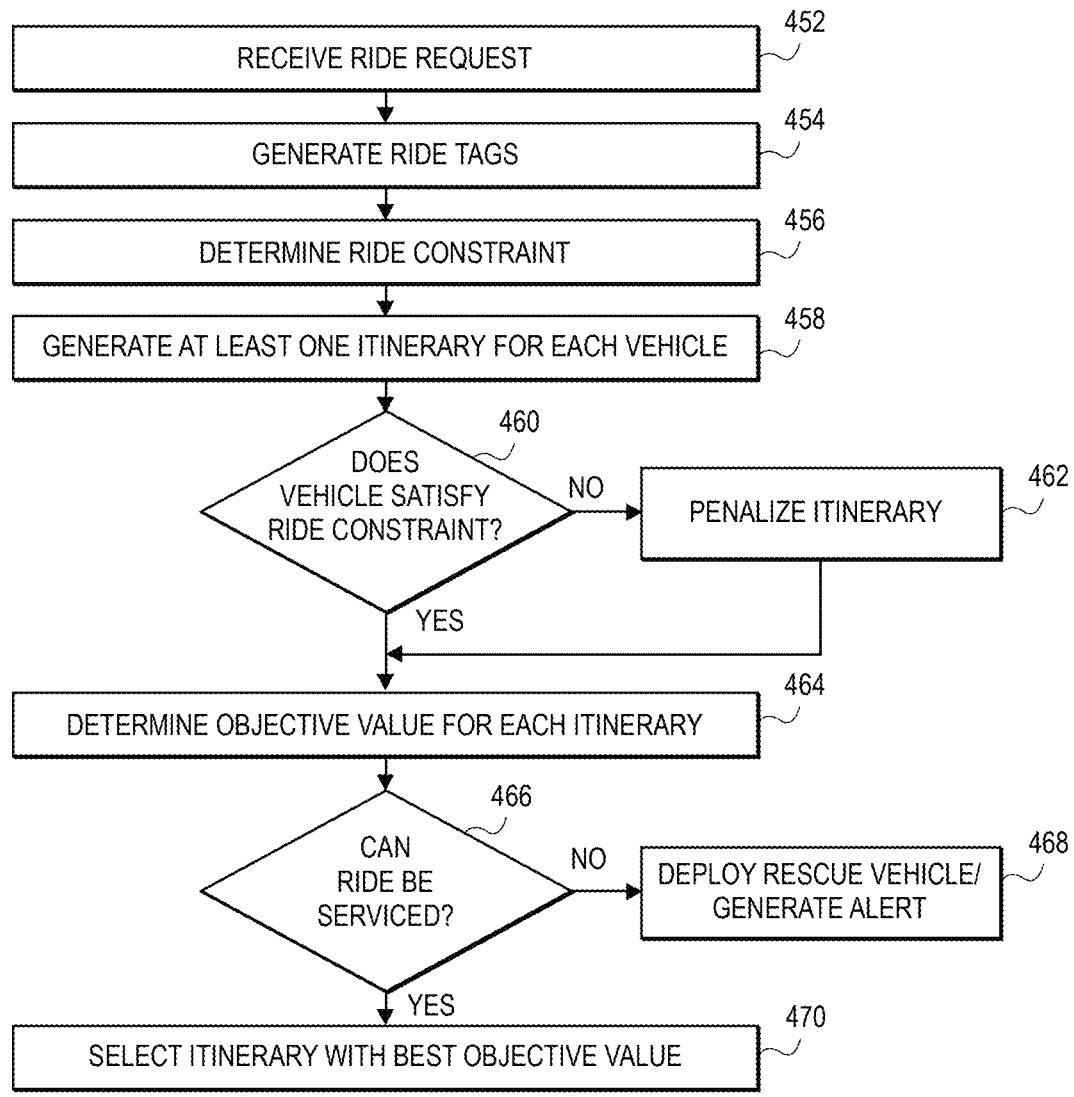
FIG. 4B illustrates a method of itinerary generation employing soft constraints for some embodiments.

FIG. 4B illustrates a method 450 for itinerary generation when soft constraints are enforced in accordance with aspects of the present disclosure. Method 450 is substantially similar to method 400 with the exception of how constraint violations may be handled. Steps 452, 454, 456 are the same as steps 402, 404, 406. At step 458, at least one itinerary 204 may be generated for each vehicle 216. Step 458 may be substantially similar to step 412 except that at least one itinerary may be generated for each vehicle rather than a subset of the vehicles 216.

From step 458, processing may proceed to test 460, where it may be determined whether the ride constraint 224 is met. Test 460 may be substantially similar to test 408 discussed with respect to method 400. If no, at step 462, a penalty value may be computed. The penalty value may be applied to the generated itinerary 204 as discussed previously. In some embodiments, the penalty value is based on a number of legs of the itinerary 204 for which the ride constraint 224 is violated. For example, if the ride constraint 224 is based on the vehicle's zone, the penalty may be based on the number of legs that the vehicle 216 drives outside of the vehicle's zone. Different constraint violations may be penalized differently (e.g., may have different penalty weights in the objective formula). Additionally, other methods for penalizing the itinerary 204 are within the scope hereof. For example, a penalty for time and/or distance operating out of an assigned zone may be a penalty. As another example, the number of passengers impacted by the violation of the constraint may be a penalty. Further, penalizing the itinerary 204 may include applying multiple penalties to the itinerary 204. For example, the itinerary 204 may include a penalty based on any combination of driving distance, driving time, number of affected passengers, along with any other penalty described herein.

Processing may proceed from step 462 to step 464 or directly from test 460 to step 464 if the vehicle 216 for a given itinerary 204 does not violate the ride constraint 224. Step 464 may be substantially similar to step 412 discussed above where the objective value for each itinerary 204 may be generated. In this case, the objective value may incorporate the penalty value. Processing may then proceed to test 466, step 468, and step 470, which may correspond to test 416, step 418, and step 420 of method 400, respectively.

User Interfaces

Figure 5A:
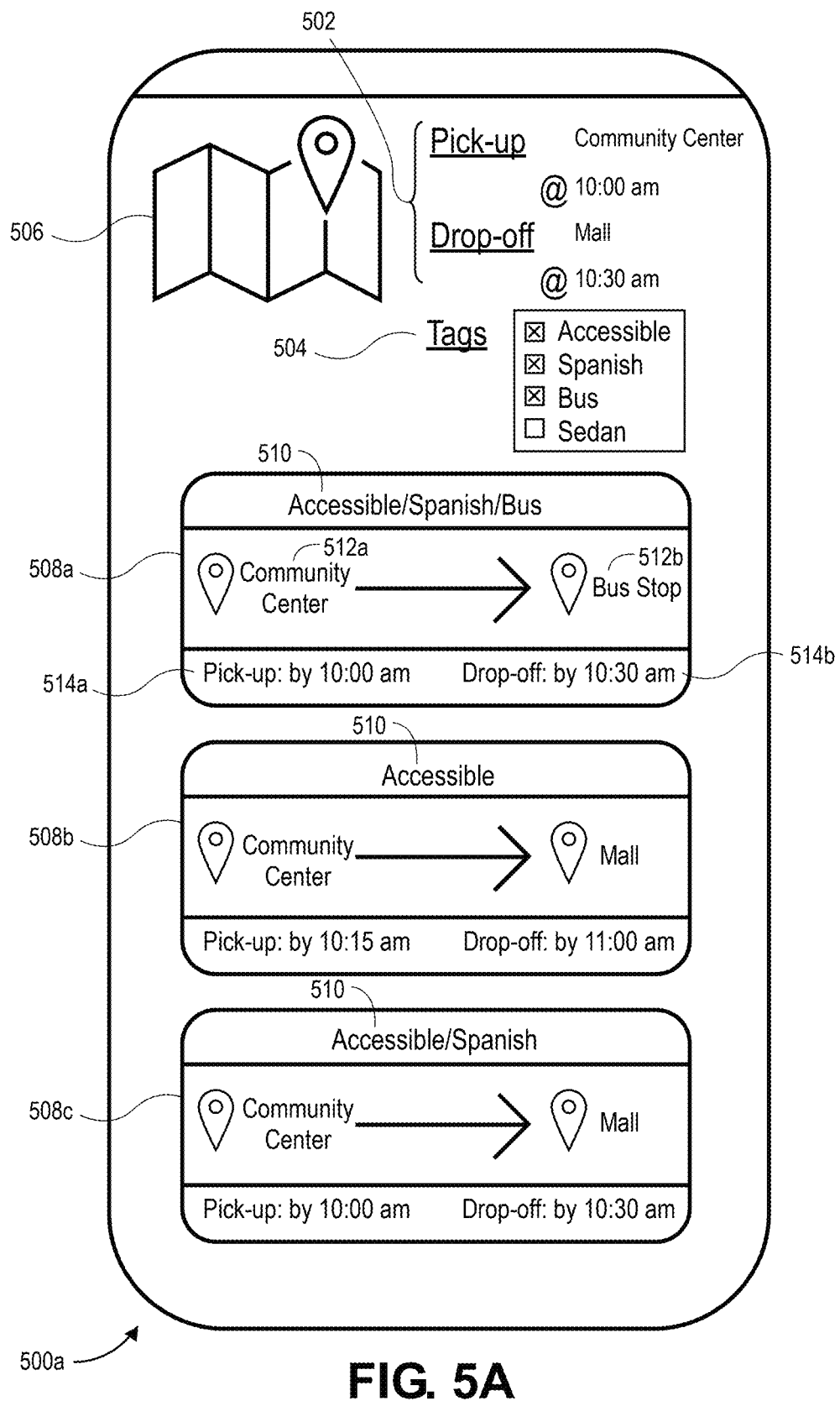
FIG. 5A illustrates a first user interface for some embodiments.

FIG. 5A illustrates an exemplary ride booking interface 500a for booking a ride for the ride-sharing service in accordance with aspects of the present disclosure. Interface 500a may be presented to a passenger booking a ride for themselves, to an operator booking a ride on behalf of a passenger, or to any other user booking a ride.

User interface 500a may comprise inputs 502, which may include a pick-up location input, a pick-up time input, a drop-off location input, a drop-off time input, or any combination thereof. The inputs 502 may correspond to at least a subset of ride parameters 210 for the ride request 206. Ride booking interface 500a may further comprise tags input 504 allowing the user to select one or more ride tags that are applied to the ride request 206 to constrain the itinerary generation of itinerary generator 202 as previously discussed.

In some embodiments, tags input 504 may be automatically populated for the user. For example, the user may have a user profile storing various information about the user, such as a preferred language, an accessibility need, and the like. In some embodiments, the user can modify the auto-populated tags and/or input their own tags. In some embodiments, ride booking interface 500a includes a map interface 506 via which the user 208 may select the pick-up and/or drop-off locations.

Once the ride parameters 210 (e.g., as received via inputs 502) are received, the ride request 206 may be generated as previously discussed. Itinerary generator 202 may then generate itineraries 204. In some embodiments, one or more itineraries are generated and communicated to the user, and the user may select an itinerary option to book the ride. For example, as depicted, a first ride option 508a, a second ride option 508b, and a third ride option 508c are illustrated. Each ride option 508a may have come from a different itinerary variation. The presented options 508a, 508b, 508c may be the itineraries 204 with three best objective values, for example.

Each option 508a, 508b, 508c, may display information about the ride. For example, the vehicle tags 510 may be displayed, enabling the user to view which of the ride tags the ride option 508a conforms with. As shown, each option 508a, 508b, 508c conforms to the accessibility tag, but options 508b, 508c do not conform to all tags and may have been generated as a result of soft constraints being imposed on the language and vehicle type (bus) tags. Additionally, a pick-up location 512a and a drop-off location 512b are depicted, along with an expected pick-up time 514a and an expected drop-off time 514b. Thus, the user can compare the different ride options 508a, 508b, 508c and select the ride option that best meets their needs. For example, the third ride option 508c does not meet all the tags set by the user; however, the third ride option 508c gets the user to their destination 30 minutes before any of the other options 508a, 508b, and the user may select to violate their parameters based on the desire to arrive at an earlier time.

It will be appreciated that inputs 502, 504 may be displayed on a separate user interface than the ride options 508a, 508b, 508c. For example a first user interface may display inputs 502, 504 for booking a ride, and once received, a ride request 206 is communicated to allocation system 200. Allocation system 200 may generate itineraries 204 as previously discussed, and options 508a, 508b, 508c may be communicated to the user via a second user interface.

Figure 5B:
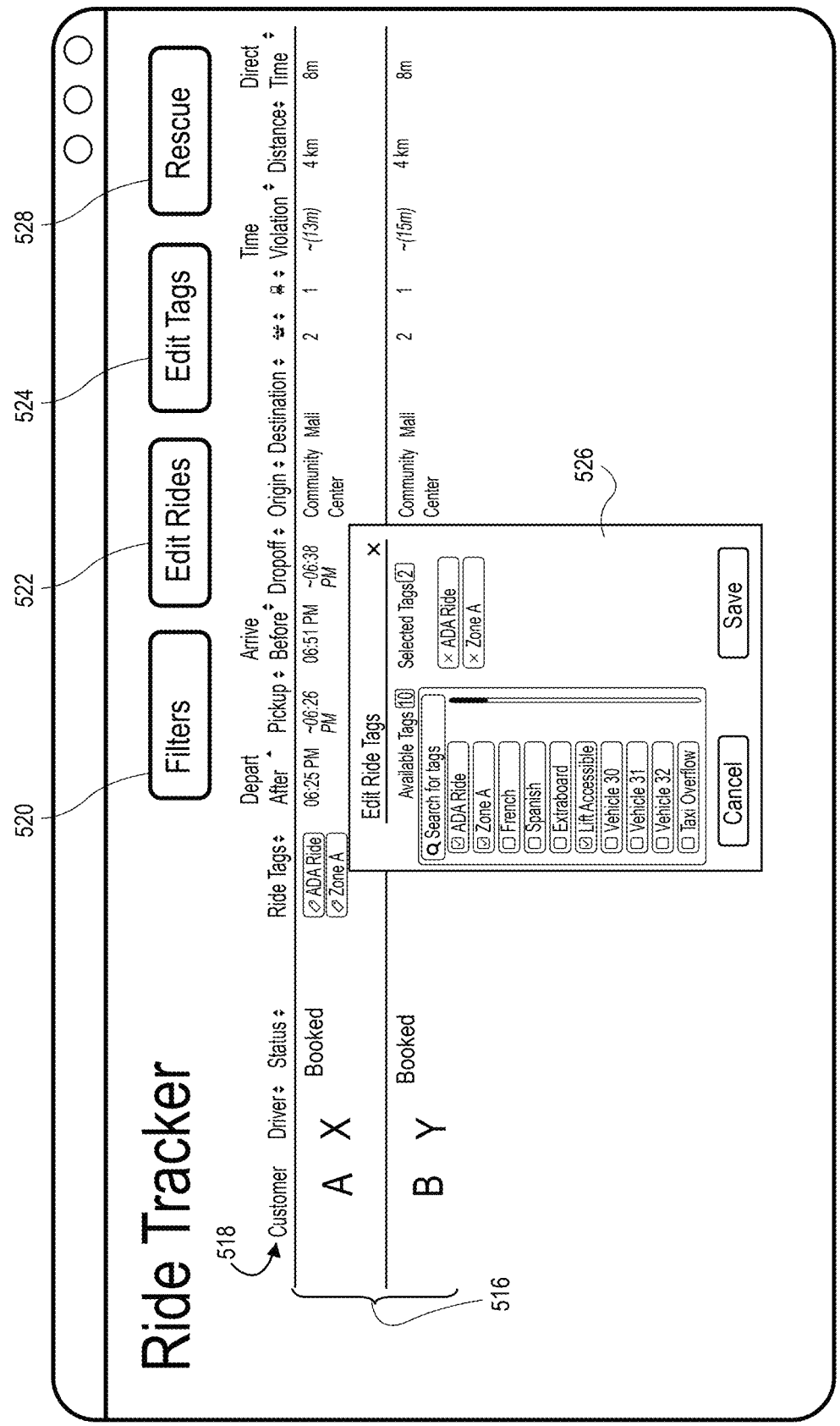
FIG. 5B illustrates a second user interface for some embodiments.

FIG. 5B illustrates an exemplary ride tracker interface 500b in accordance with embodiments of the present disclosure. Interface 500b may be presented to an operations user who may oversee operations of the ride-sharing service, for example, while the drivers are executing the legs for the itineraries 204. The operations user may make manual adjustments to the itineraries 204 in some embodiments. The manual adjustment to the itinerary 204 may cause the re-computation of an optimal itinerary 204 conforming to the manual input provided by the user.

In some embodiments, ride tracker interface 500b displays a plurality of rides 516, each ride 516 having a plurality of ride fields 518 populated with various data about the ride 516. The ride fields 518 may include any combination of the following: customer/passenger name, driver name, ride status (e.g., booked, cancelled, not yet assigned etc.), ride tags, after time, pickup time, arrive before time, drop-off time, origin (e.g., pick-up location), destination (e.g., drop-off location), number of passengers, number of seats available, time violation, driving distance, driving time, or any other information about the ride 516. Any of the above-described elements in ride fields 518 may correspond to the ride parameters 210.

In some embodiments, ride tracker interface 500b is filterable using filters 520, such as by customer, driver, region, or any combination thereof. In some embodiments, exemplary user interface 500b is filterable by tags. For example, exemplary user interface 500b may be filtered to show only those trips with a zone A tag.

In some embodiments, exemplary user interface 500b may comprise an edit rides affordance 522. The edit rides affordance 522 may enable manual changes to a ride to be made, such as assigning the ride to a new driver or the like. In response to an edit to a ride being made, allocation system 200 may regenerate itineraries to determine whether any other rides should also be adjusted based on the newly-computed objective value. Similarly, an edit tags affordance 524 may be provided. The edit tags affordance 524 may enable the user to edit the tags applied to a ride and may cause an edit tags pane 526 to be displayed, which may display a list of selectable tags for applying to a ride. In some embodiments, tags for a ride can be manually adjusted to be applied with a hard constraint or a soft constraint.

In some embodiments, ride tracker interface 500b additionally comprises a rescue affordance 528. In some embodiments, the rescue affordance 528 causes the deployment of a rescue vehicle to service a ride. For example, via the ride tracker interface 500b, the operations user may see or be alerted that a vehicle for a ride is going to be late and may cause the deployment of a rescue vehicle to pick up the passenger. Deploying the rescue vehicle may be done by automatically assigning the necessary tags to the rescue vehicle that enables the rescue vehicle to be matched to the ride during itinerary generation. As previously discussed, the rescue vehicles may automatically be assigned to rides in some embodiments, such as when it is determined that no vehicles are able to serve a ride request.

Assigning Ride Tags Via Machine Learning

Figure 6:
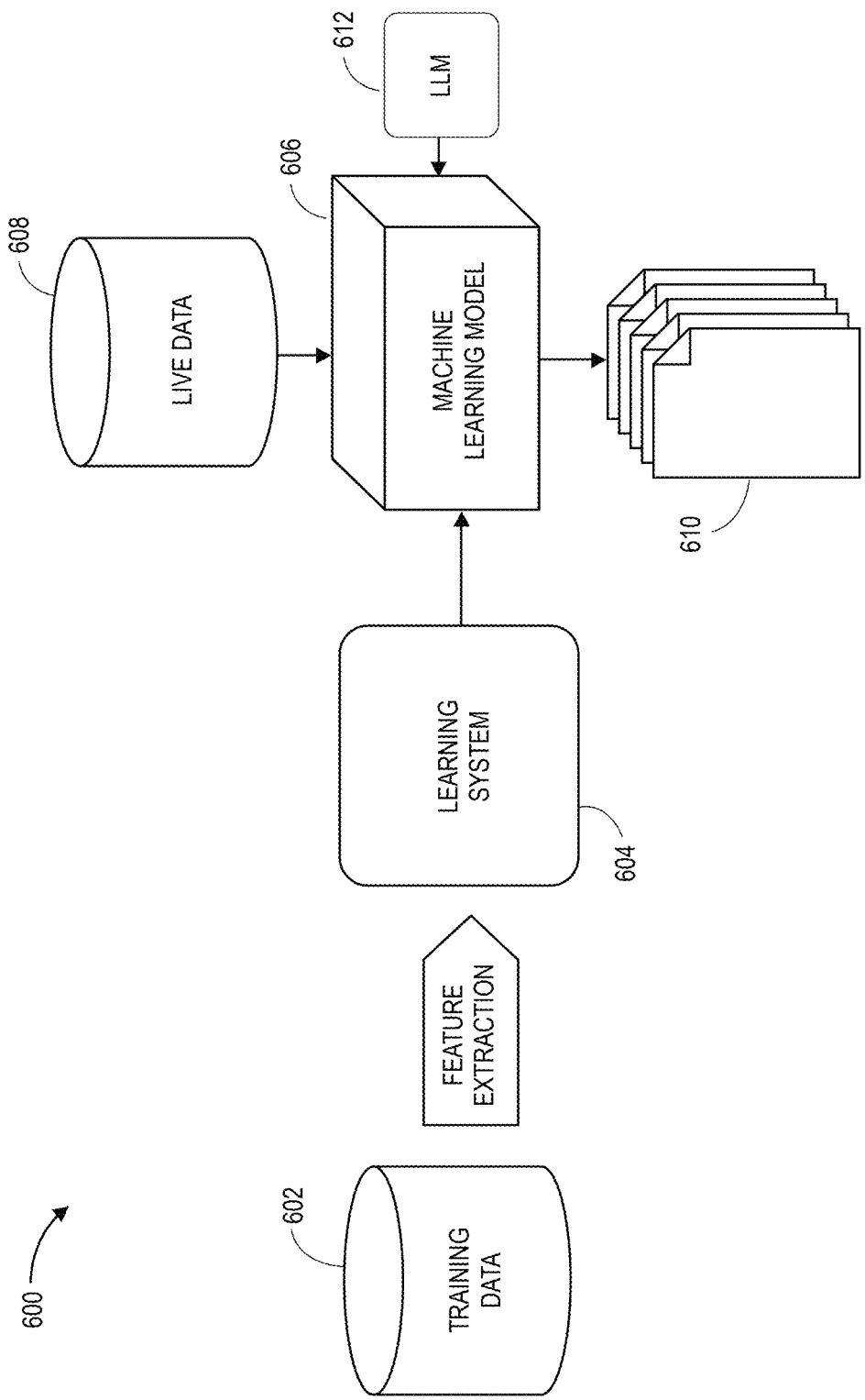
FIG. 6 illustrates an exemplary machine learning model for some embodiments.

FIG. 6 illustrates an exemplary machine learning architecture 600 in accordance with embodiments of the present disclosure. In some embodiments, the architecture 600 includes a machine learning model 602, training data 604, a learning algorithm 606, live data 608, ride tags 610, a large language model (LLM) 612, or any combination thereof.

As previously discussed, it is contemplated that ride tags 214 may be generated/assigned to rides using a machine learning model 602. The machine learning model 602 may be trained using training data 604. In some embodiments, the training data 604 may include previously assigned ride tags and any other data associated with the ride tags or associated with the ride associated with the ride tags. For example, the parameters 210 used to assign ride tags 214 may be used as training data 604 for training the machine learning model 602. As another example, the historical training data 604 may include data indicative of a manually assigned tag, which may be used to train machine learning model 602 that similar ride requests should be automatically assigned the tag. In some embodiments, any penalty imposed on itinerary generation for a ride associated with a ride tag 214 is also incorporated into the training data 604. Accordingly, the machine learning model 602 may be trained to assign ride tags that minimize a penalty value on the generated itinerary. As yet another example, the training data 604 may include data indicative of not-serviced requests, requests that were serviced late (or violated some other parameter), or requests for which a rescue vehicle 304g was required. Accordingly, upon receipt of a similar request, machine learning model 602, suitably trained, may assign or suggest a high-priority tag or an emergency tag to the ride request to ensure the ride is serviced.

Using this training data 604, feature extraction may be performed on the training data 604 to extract features therefrom as will be appreciated by one of skill in the art. Subsequently, a learning algorithm 606 may be trained on the training data 604 to obtain the trained machine learning model 602. In some embodiments, the learning algorithm 606 is a classification algorithm configured to classify/assign an incoming ride request 206 into one or more ride tags 610 (corresponding to ride tags 214). For example, the machine learning model 602 may be trained to map a ride request 206 having a wheelchair-accessibility parameter 210 to wheelchair-accessibility ride tag 610 that is assigned to the ride request.

During operations of the ride-sharing service, the machine learning model 602 may receive live data 608 and process the live data 608 to assign one or more ride tags 610 (corresponding to ride tags 214 discussed above). In some embodiments, the live data 608 includes ride requests 206 and any parameters 210 associated therewith. Once received, machine learning model 602 may process the live data 608 to generate ride tags 610. In some embodiments, the ride tags 610 are then presented to a user for confirmation/approval and/or for the user to adjust the outputted ride tags 610. Thereafter, a vehicle 216 may be assigned to the ride request 206 based on the ride tags 610 as discussed previously.

Also illustrated in FIG. 6 is a large language model (LLM) 612. Embodiments of the present disclosure may employ an LLM 612 to interpret a user's ride request 206 (which may be received verbally or via unstructured text input or the like in some embodiments) to determine a ride tag 610 based on the ride request 206 and/or to transform the user input into a format usable/understandable by machine learning model 602 for assigning the ride tag 610. For example, the LLM 612 may determine or create keywords or the like from the ride request 206 that can be passed to the machine learning model 602 and classified by the machine learning model 602 into a ride tag 610.

As another example use case of machine learning in the context of the present disclosure, it is contemplated a machine learning model 602 could be trained to automatically assign vehicle tags 220 to vehicles 216 as new vehicles are added into service. Thus, for example, the machine learning model 602 could be trained using training data 604 including vehicle tags 220 and vehicle parameters 218 of in-use vehicles 216, and the learning algorithm may comprise a classification algorithm that assigns vehicle tags 220 to new vehicles. For example, the machine learning model 602 may analyze one or more vehicle parameters 218 of a newly-added vehicle, determine other vehicles with similar parameters 218, and assign vehicle tags 220 to the newly added vehicle based on the vehicle tags of the similar vehicles.

The following embodiments represent exemplary embodiments of concepts contemplated herein. Any one of the following embodiments may be combined in a multiple-dependent manner to depend on one or more other clauses. Further, any combination of dependent embodiments (e.g., clauses that explicitly depend on a previous clause) may be combined while staying within the scope of aspects contemplated herein. The following clauses are exemplary in nature and are not limiting.

Clause 1. A method for constrained itinerary generation for a ride-sharing service, comprising: receiving a ride request comprising a pick-up location and a drop-off location; determining a first ride constraint for the ride request based on the pick-up location and the drop-off location; assigning a vehicle of a plurality of vehicles to the ride request by: inserting the ride request into at least one itinerary for each of the plurality of vehicles, determining whether each of the plurality of vehicles satisfies the first ride constraint; determining, for the at least one itinerary of each vehicle that does not satisfy the first ride constraint, a penalty value; computing, for the at least one itinerary for each of the plurality of vehicles, an objective value that incorporates the penalty value to obtain a plurality of objective values; and assigning the ride request to an itinerary having an optimal objective value from the plurality of objective values.

Clause 2. The method of clause 1, wherein the first ride constraint comprises a ride constraint data structure having a vehicle whitelist and a vehicle blacklist.

Clause 3. The method of clauses 1 or 2, wherein determining whether the vehicle satisfies the first ride constraint comprises determining whether a vehicle identifier of the vehicle is in the vehicle whitelist.

Clause 4. The method of any of clauses 1 through 3, further comprising assigning at least a subset of the plurality of vehicles a vehicle tag based on a vehicle service region; and wherein determining whether the vehicle satisfies the first ride constraint comprises determining whether at least one of the pick-up location of the drop-off location are within the vehicle service region associated with the vehicle tag.

Clause 5. The method of any of clauses 1 through 4, wherein the ride request further comprises at least one ride parameter and wherein the method further comprises: determining a second ride constraint for the ride request based on the at least one ride parameter; and wherein assigning the vehicle to serve the ride request is further constrained based on the second ride constraint.

Clause 6. The method of any of clauses 1 through 5, wherein the second ride constraint is a ride accessibility constraint.

Clause 7. The method of any of clauses 1 through 6, wherein the method further comprises: assigning each vehicle a vehicle tag based on at least one of: a vehicle service region, a vehicle fleet of the vehicle, or a vehicle type, and wherein determining whether the vehicle satisfies the first ride constraint is based on the vehicle tag.

Clause 8. The method of any of clauses 1 through 7, further comprising: determining the ride request cannot be serviced by the plurality of vehicles; and responsive to this determination, automatically requisitioning a rescue vehicle to service the ride request.

Clause 9. The method of any of clauses 1 through 8, wherein determining the ride request cannot be serviced by the plurality of vehicles is based at least in part on real-time GPS received from the plurality of vehicles or a corresponding plurality of drivers of the plurality of vehicles.

Clause 10. One or more non-transitory computer-readable media storing computer-executable instructions that, when executed by at least one processor, perform a method for constrained itinerary generation, comprising: receiving a ride request comprising at least one ride parameter; determining a first ride constraint for the ride request based on the at least one ride parameter; determining, for each of a plurality of vehicles, whether a vehicle satisfies the first ride constraint; responsive to determining the vehicle does not satisfy the first ride constraint, removing the vehicle from a search space for itinerary generation; for each vehicle of the plurality of vehicles satisfying the first ride constraint, generating at least one itinerary including the ride request inserted into a leg of the at least one itinerary to obtain a plurality of itineraries; calculating, for each of the plurality of itineraries, an objective value; and selecting, from the plurality of itineraries, an itinerary having an optimized objective value.

Clause 11. The one or more non-transitory computer-readable media of clause 10, wherein the first ride constraint comprises a vehicle whitelist comprising at least one vehicle identifier, and wherein determining whether the vehicle satisfies the first ride constraint comprises determining whether the at least one vehicle identifier is in the vehicle whitelist.

Clause 12. The one or more non-transitory computer-readable media of clauses 10 or 11, wherein each vehicle comprises a vehicle tag determined based on at least one of a vehicle service region, a vehicle fleet, a vehicle type, or a vehicle driver, and wherein the vehicle tag is added to the vehicle whitelist based on the vehicle tag matching the at least one ride parameter.

Clause 13. The one or more non-transitory computer-readable media of any of clauses 10 through 12, further comprising: receiving a manual adjustment to the at least one ride parameter; re-determining the itinerary having the optimized objective value based on the manual adjustment to the at least one ride parameter.

Clause 14. The one or more non-transitory computer-readable media of any of clauses 10 through 13, wherein the at least one ride parameter comprises a first ride parameter and a second ride parameter, wherein the first ride constraint is based on the first ride parameter, and further comprising: determining a second ride constraint based on the second ride parameter; and responsive to determining the vehicle satisfies the first ride constraint and does not satisfy the second ride constraint, determining a penalty value for the vehicle, wherein the penalty value is applied to the objective value.

Clause 15. The one or more non-transitory computer-readable media of any of clauses 10 through 14, wherein the first ride constraint comprises a vehicle blacklist, and wherein determining whether the vehicle does not satisfy the first ride constraint comprises determining at least one vehicle identifier is in the vehicle blacklist.

Clause 16. A system for constrained itinerary generation in a ride-sharing system comprising: at least one processor; and one or more non-transitory computer-readable media that, when executed by the at least one processor, cause the system to carry out actions, comprising: receiving a ride request having at least one ride parameter; determining, for the ride request, a ride constraint based on the at least one ride parameter, wherein the ride constraint comprises a vehicle whitelist and a ride whitelist; determining, for each vehicle of a plurality of vehicles, whether a vehicle identifier for each vehicle is in the vehicle whitelist; responsive to determining the vehicle identifier for a vehicle is not in the vehicle whitelist: removing an itinerary associated with the vehicle from a search space, or computing a penalty value for the itinerary; generating a plurality of itineraries to obtain an optimized itinerary; and selecting the optimized itinerary to serve the ride request.

Clause 17. The system of clause 16, wherein the ride request is a first ride request and wherein the actions further comprise: receiving a second ride request comprising a ride identifier; responsive to determining that the ride identifier is not in the ride whitelist of the first ride request, preventing assignment of the second ride request to the vehicle associated with the optimized itinerary.

Clause 18. The system of clauses 15 or 16, wherein the actions further comprise: receiving a second ride request; responsive to determining the second ride request cannot be served by the plurality of vehicles, assigning a rescue vehicle to service the ride request.

Clause 19. The system of any of clauses 15 through 18, wherein assigning the rescue vehicle to serve the ride request comprises: adding a rescue vehicle identifier of the rescue vehicle to a second vehicle whitelist associated with the second ride request such that the rescue vehicle satisfies a second ride constraint of the second ride request.

Clause 20. The system of any of clauses 15 through 19, wherein the penalty value is based on at least one of a number of legs the ride constraint is violated or a driving distance the ride constraint is violated.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

The invention claimed is:

1. A method for constrained itinerary generation for a fleet-based vehicular ride-sharing service, comprising:
   receiving a ride request comprising a pick-up location and a drop-off location;
   determining a first ride constraint for the ride request based on the pick-up location and the drop-off location; and
   assigning a vehicle of a plurality of vehicles to the ride request by:
      inserting the ride request into at least one itinerary for each of the plurality of vehicles,
      determining whether each of the plurality of vehicles satisfies the first ride constraint,
      wherein at least one of the plurality of vehicles is a bus,
      wherein the first ride constraint comprises a vehicle blacklist,
      wherein determining that the vehicle does not satisfy the first ride constraint comprises determining at least one vehicle identifier for the vehicle is in the vehicle blacklist;
      computing, for the at least one itinerary for each of the plurality of vehicles, an objective formula to obtain an objective value such that a plurality of objective values is obtained,
      wherein the objective value is a value of at least one parameter for the ride request;
      applying, based on whether the vehicle satisfies the first ride constraint, a penalty to at least one of the plurality of objective values,
      wherein the penalty is based on at least one of a number of legs of the at least one itinerary for which the first ride constraint is violated or a driving distance of the at least one itinerary for which the first ride constraint is violated; and
      assigning the ride request to an itinerary with an optimal objective value from the plurality of objective values.

2. The method of claim 1, wherein the first ride constraint comprises a ride constraint data structure having a vehicle whitelist and the vehicle blacklist.

3. The method of claim 2, wherein determining whether the vehicle satisfies the first ride constraint comprises determining whether a vehicle identifier of the vehicle is in the vehicle whitelist.

4. The method of claim 1, further comprising:
assigning, to at least a subset of the plurality of vehicles, a vehicle tag based on a vehicle service region,
wherein determining whether the vehicle satisfies the first ride constraint comprises determining whether at least one of the pick-up location or the drop-off location are within the vehicle service region associated with the vehicle tag.

5. The method of claim 1, wherein the ride request further comprises at least one ride request parameter and wherein the method further comprises:
determining a second ride constraint for the ride request based on the at least one ride request parameter,
wherein assigning the vehicle to serve the ride request is further constrained based on the second ride constraint.

6. The method of claim 5, wherein the second ride constraint is a ride accessibility constraint.

7. The method of claim 1, wherein the method further comprises:
assigning each vehicle a vehicle tag based on at least one of: a vehicle service region, a vehicle fleet of the vehicle, or a vehicle type,
wherein determining whether the vehicle satisfies the first ride constraint is based on the vehicle tag.

8. The method of claim 1, further comprising:
determining the ride request cannot be serviced by the plurality of vehicles; and
responsive to this determination, automatically requisitioning a rescue vehicle to service the ride request.

9. The method of claim 8, wherein determining the ride request cannot be serviced by the plurality of vehicles is based at least in part on real-time GPS received from the plurality of vehicles or a corresponding plurality of drivers of the plurality of vehicles.

10. One or more non-transitory computer-readable media storing computer-executable instructions that, when executed by at least one processor, perform a method for constrained itinerary generation in a fleet-based automobile ride-sharing service, comprising:
receiving a ride request comprising at least one ride request parameter;
determining a first ride constraint for the ride request based on the at least one ride request parameter, the first ride constraint comprising:
a vehicle whitelist comprising at least one vehicle identifier; and
a vehicle blacklist;
determining, for each of a plurality of vehicles, whether a vehicle satisfies the first ride constraint by determining whether the at least one vehicle identifier is in the vehicle whitelist,
wherein each vehicle comprises a vehicle tag determined based on at least one of a vehicle service region, a vehicle fleet, a vehicle type, or a vehicle driver,
wherein the vehicle tag is added to the vehicle whitelist based on the vehicle tag matching the at least one ride request parameter;
responsive to determining the vehicle does not satisfy the first ride constraint, removing the vehicle from a search space for itinerary generation,
wherein determining that the vehicle does not satisfy the first ride constraint comprises determining the at least one vehicle identifier is in the vehicle blacklist;
for each vehicle of the plurality of vehicles satisfying the first ride constraint, generating at least one itinerary including the ride request inserted into a leg of the at least one itinerary to obtain a plurality of itineraries;
calculating, for each candidate itinerary of the plurality of itineraries, an objective value,
wherein the objective value is a value of at least one metric associated with the ride request or the candidate itinerary, wherein the at least one metric includes at least one of a travel time, a travel distance, or a number of itinerary legs; and
selecting, from the plurality of itineraries, an itinerary having an optimized objective value.

11. The method of claim 1, wherein assigning the vehicle of the plurality of vehicles to the ride request is performed in real time using at least one of a parallel processing system or a distributed computing architecture.

12. The one or more non-transitory computer-readable media of claim 10, wherein the vehicle in the fleet-based automobile ride-sharing service is a bus or a wheelchair-accessible vehicle.

13. The one or more non-transitory computer-readable media of claim 10, further comprising:
receiving a manual adjustment to the at least one ride request parameter;
re-determining the itinerary having the optimized objective value based on the manual adjustment to the at least one ride request parameter.

14. The one or more non-transitory computer-readable media of claim 10, wherein the at least one ride request parameter comprises a first ride request parameter and a second ride request parameter, wherein the first ride constraint is based on the first ride request parameter, and further comprising:
determining a second ride constraint based on the second ride request parameter; and
responsive to determining the vehicle satisfies the first ride constraint and does not satisfy the second ride constraint, applying a penalty to the objective value associated with the vehicle.

15. A system for constrained itinerary generation in a fleet-based vehicular ride-sharing system comprising:
at least one processor; and
one or more non-transitory computer-readable media that, when executed by the at least one processor, cause the system to carry out actions, comprising:
receiving a ride request having at least one ride request parameter;
determining, for the ride request, a ride constraint based on the at least one ride request parameter,
wherein the ride constraint comprises a vehicle whitelist, a vehicle blacklist, and a ride whitelist;
determining, for each vehicle of a plurality of vehicles, whether a vehicle identifier for each vehicle is in the vehicle whitelist or is in the vehicle blacklist,
wherein the plurality of vehicles comprises at least one of a bus or a wheelchair-accessible vehicle;
responsive to determining the vehicle identifier for a vehicle is not in the vehicle whitelist or is in the vehicle blacklist:
removing an itinerary associated with the vehicle from a search space, or applying a penalty to the itinerary,
wherein the penalty is based on at least one of a number of legs for which the ride constraint is violated or a driving distance for which the ride constraint is violated;
generating a plurality of itineraries to obtain an optimized itinerary; and
selecting the optimized itinerary to serve the ride request.

16. The system of claim 15, wherein the optimized itinerary is heuristically determined by:
  computing a plurality of itinerary variants that each have an objective value, and
  wherein the objective value is a value of at least one metric for the ride request,
  wherein the optimized itinerary is the itinerary of the plurality of itineraries with an optimized objective value.

17. The system of claim 15, wherein the ride request is a first ride request and wherein the actions further comprise:
  receiving a second ride request comprising a ride identifier;
  responsive to determining that the ride identifier is not in the ride whitelist of the first ride request, preventing assignment of the second ride request to the vehicle associated with the optimized itinerary.

18. The system of claim 15, wherein the actions further comprise:
  receiving a second ride request;
  responsive to determining the second ride request cannot be served by the plurality of vehicles, assigning a rescue vehicle to service the ride request.

19. The system of claim 18, wherein assigning the rescue vehicle to serve the ride request comprises:
  adding a rescue vehicle identifier of the rescue vehicle to a second vehicle whitelist associated with the second ride request such that the rescue vehicle satisfies a second ride constraint of the second ride request.

20. The system of claim 16,
  wherein the at least one metric comprises at least one of a travel time, a travel distance, or a number of itinerary legs,
  wherein the optimized objective value is one of a minimized objective value or a maximized objective value.

* * * * *